Figure 1:
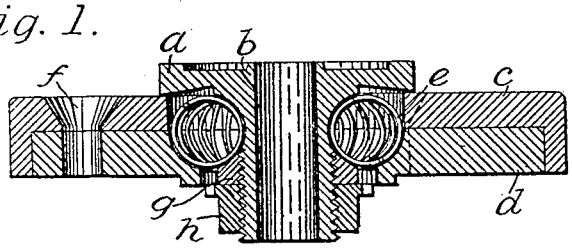

No. 803,235. PATENTED OCT. 31, 1905.
D. W. JORDAN.
ELASTIC COLLAR BEARING.
APPLICATION FILED AUG. 6, 1904.

WITNESSES:
J. F. Albrecht
M. Kennedy

INVENTOR.
DELOSS W. JORDAN,
BY G. E. Kennedy
ATTORNEY.

UNITED STATES PATENT OFFICE.

DELOSS W. JORDAN, OF WATERLOO, IOWA.

ELASTIC COLLAR-BEARING.

No. 803,235.      Specification of Letters Patent.      Patented Oct. 31, 1905.

Application filed August 6, 1904. Serial No. 219,794.

*To all whom it may concern:*

Be it known that I, DELOSS W. JORDAN, a citizen of the United States of America, and a resident of Waterloo, Blackhawk county, Iowa, have invented certain new and useful Improvements in Elastic Collar-Bearings, of which the following is a specification.

My invention relates to improvements in elastic collar-bearings; and the object of my improvement is to furnish simple and elastic means for yieldably restraining oblique movements of a shaft in a bearing.

This object I have accomplished by the means which are hereinafter described and claimed, and which are illustrated in the drawings hereto annexed, in which—

Figure 2:
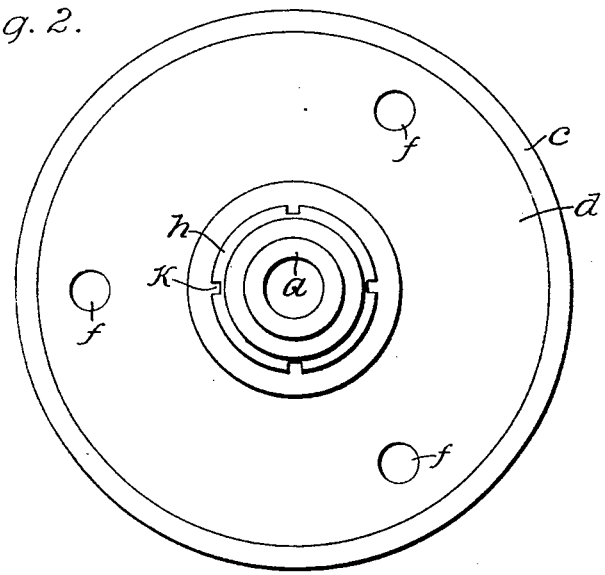
Figure 3:
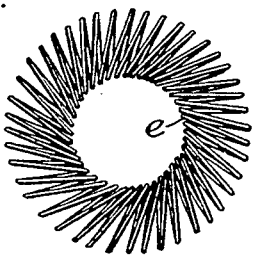

Figure 1 is a transverse vertical section of my device taken through the center or axis of the bearing. Fig. 2 is an under plan view of the bearing and its seat; and Fig. 3 is a detail view showing my improved obliquely-wound spiral spring, such as is used by me in the said device.

Similar letters refer to similar parts throughout the several views.

As is well known, many forms of elastic bearings are in use, which, however, are usually quite complicated in construction, with many parts, or having parts which do not perfectly support each other or operate under compression satisfactorily, or which require several adjustments in order to keep them from working a positive injury to the shaft and bearing rather than a benefit.

My device has but one central means of adjustment, which affects all parts of the bearing alike, and the elastic means therein is of such a nature as to always keep its position responsive to all stresses exerted upon it by the shaft equally and cannot become displaced by reason of the exercise against it of any ordinary force.

The device is intended primarily for use with centrifugal machines, but will be found useful if incorporated into bearings of any description of shafts where there is any thrust or oblique stress by or from the shaft.

As shown in Fig. 1, a seat for the bearing $a$ is formed by fitting the perforated circular plate $d$ within the flanges of the perforated disk $c$. The said plate and disk may be provided with bolt-holes $f$ for the reception of bolts or screws for the purpose of fastening them to any suitable base. The bearing $a$ has a centrally-perforated body for the reception of a shaft, and the lower portion of such body is exteriorly threaded to receive the compression-nut $g$ and the lock-nut $h$. A concentric recess is formed about the upper portion of the body of the bearing and just above its threaded surface to receive the ring-shaped spiral spring $e$. The large perforation in the upper disk $c$ and the circular recess about the inner and upper sides of the large perforation in the plate $d$ are adapted to surround closely the said spiral spring and against which it is compressed when under the influence of oblique stresses from the shaft. The upper portion of the bearing-body $a$ has a laterally-extending flange or overhang which contacts with its under edges with the upper surface of the disk $c$ around the central perforation and serves to support the bearing in its normal central position.

The spiral spring $e$, of which the detail is given in Fig. 3, is of a peculiar construction and design, and therein resides the pith of my invention. The wire of which said spring is made is wound or fashioned so that the coils thereof lie obliquely at approximately an angle of forty-five degrees with the radius of the bearing, or nearly at a tangent with the circle formed by the bearing-surface of the recess in which the spring is seated. It is obvious that with an ordinary coiled spring the coils thereof would lie so as to vary little from the radius of the bearing and would thus be comparatively incompressible as against stresses exerted against the coils from either side. When my form of spring is used, however, the oblique inclination of the coils causes them to yield elastically and be compressible within the lessened space in the bearing when the shaft vibrates to either side. As the coils are endlessly joined, as shown, the whole spring coöperates under a stress, and while yielding yet exerts sufficient elastic stress upon the shaft to protect the bearing and cause return of the shaft, and as the spring is single and extends continuously about the bearing-body its action is uniform throughout.

Oil or other suitable lubricant may be introduced through the perforation $b$ in the bearing-body $a$ when desired.

Having described my invention, what I claim as new, and desire to secure by Letters Patent, is—

1. An elastic collar-bearing, comprising a bearing-body, a seat for said bearing-body consisting of a perforated plate, a spiral spring arranged between said bearing-body and its seat and concentric with said bearing-body, and whose coils are inclined obliquely to the radius thereof.

2. An elastic collar-bearing, comprising a bearing-body, a seat for said bearing-body consisting of a perforated plate, a spiral spring arranged between said bearing-body and its seat and concentric with said bearing-body, and whose coils are inclined obliquely to the radius thereof, and a two-part compression-nut.

3. In an elastic collar-bearing, a collapsible spiral spring whose coils are obliquely inclined to the radius of the bearing-body, said spring surrounding the bearing-body.

Signed at Waterloo, Iowa, this 20th day of July, 1904.

DELOSS W. JORDAN.

Witnesses:
C. F. WICHMAN,
F. L. CHAMBERLAIN.